(12) United States Patent
Greve et al.

(10) Patent No.: US 7,066,606 B2
(45) Date of Patent: Jun. 27, 2006

(54) OUTPUT STABILIZATION FOR A LASER MATRIX

(75) Inventors: Peter Ferdinand Greve, Eindhoven (NL); Olaf Thomas Johan Antonie Vermeulen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 66 days.

(21) Appl. No.: 10/477,873

(22) PCT Filed: May 16, 2002

(86) PCT No.: PCT/IB02/01722

§ 371 (c)(1),
(2), (4) Date: Nov. 13, 2003

(87) PCT Pub. No.: WO02/093912

PCT Pub. Date: Nov. 21, 2002

(65) Prior Publication Data

US 2004/0130668 A1    Jul. 8, 2004

(30) Foreign Application Priority Data

May 17, 2001 (EP) .................................. 01201870

(51) Int. Cl.
*G03B 21/00* (2006.01)

(52) U.S. Cl. .................... 353/85; 353/94; 353/121; 348/800

(58) Field of Classification Search .............. 353/85, 353/86, 122, 97, 94, 28, 31, 34, 37, 88–90, 353/121; 349/61, 69–72; 362/235–240, 362/231, 259, 800, 253, 214, 555; 348/800–803; 372/29.01, 29.011, 29.014, 38.1, 38.01, 38.02; 359/649–651

See application file for complete search history.

(56) References Cited

U.S. PATENT DOCUMENTS

| 5,123,024 A  * | 6/1992  | Dowd et al.  | 372/29.015 |
| 5,525,810 A    | 6/1996  | Jewell et al.| 250/566    |
| 6,233,039 B1 * | 5/2001  | Yen et al.   | 355/53     |
| 6,412,956 B1 * | 7/2002  | Fujita et al.| 353/122    |
| 6,803,991 B1 * | 10/2004 | Mori         | 355/53     |

* cited by examiner

*Primary Examiner*—W. B. Perkey
*Assistant Examiner*—Andrew Sever
(74) *Attorney, Agent, or Firm*—Larry Liberchuk

(57) ABSTRACT

A projection device comprises a matrix (1) of semiconductor lasers, an optical system (2) for projecting the matrix (1) on an element (3) illuminated by the projection device, and a control device (9) for controlling the semiconductor lasers through a feedback device. The feedback device comprises a first detector (13, 14) that generates a first signal representing the detected intensity. The semiconductor lasers are controlled and the intensity of the light spot is adjusted to a desired value by the feedback device. Light from a semiconductor laser is detected by a second detector (18), and a value of the detected signal is stored in an addressable memory cell. The amount of emitted light is stabilized for each semiconductor laser by detection through the second detector (18) and comparison with the value stored in the memory (29) for the relevant controlled semiconductor laser.

5 Claims, 2 Drawing Sheets

OUTPUT STABILIZATION FOR A LASER MATRIX

The invention relates to a projection device comprising a matrix of semiconductor lasers, an optical system for imaging the matrix on an element illuminated by the projection device, a control device for controlling the semiconductor lasers, which control device comprises a feedback device including a first detector for detecting the intensity of a light spot projected by each semiconductor laser on the illuminated element via the optical system, and for generating a first signal representing the detected intensity.

The invention also relates to a method of adjusting a projection device comprising a matrix of semiconductor lasers.

Such a device and method are known from U.S. Pat. No. 5,525,810. This patent describes a projection device which is used for scanning a bar code. In a calibration mode, a uniform screen is placed in the light path. The semiconductor lasers are consecutively activated, one at a time, and the intensity of the light spot projected by each activated semiconductor laser on the uniform screen is detected by means of a detector. A signal generated by the detector is processed and used for controlling the power supply for the matrix of semiconductor lasers. The device described is not designed and not suitable for projecting images such as, for example, TV image projection.

Semiconductor lasers which are used for image projection should be stabilized in their light output because the quantity of light supplied at a given current by the laser is considerably dependent on temperature and lifetime. In many semiconductor lasers, which have sufficiently large dimensions, stabilization takes place by means of a monitor diode which is incorporated on the rear side of the laser chip and with which the light output of the laser can be measured. Such a measurement does not disturb the quantity of emitted light and is reliable because the ratio between the light output on the laser side and the light output on the rear side to the monitor diode is constant. Consequently, the intensity measured on the rear side can be suitably used for stabilizing the light output on the front side.

A matrix of semiconductor lasers which is suitable for image projection has a pitch of the order of 50 μm. The aperture angle of exiting beams from semiconductor lasers of such a matrix is so large that the beams overlap within 0.25 mm. In practice, it is extremely difficult to provide all lasers of such a matrix of semiconductor lasers with a monitor diode which is both small enough and suitably positioned to receive light from only a single semiconductor laser.

The lifetime dependence of such semiconductor lasers does not show any large changes on a short term.

It is an object of the invention to provide a projection device as described in the opening paragraph, in which the semiconductor lasers of the matrix of semiconductor lasers can be stabilized individually to a sufficient extent.

According to the invention, this object is achieved in a projection device in that the control device is adapted to control the semiconductor lasers one by one in a first adjusting phase and in a second adjusting phase, in that the control device is adapted to adjust the intensity of the light spot on the basis of the first signal in the first adjusting phase relating to a controlled semiconductor laser, in that the feedback device is adapted to detect, in the first adjusting phase, light emitted by the controlled semiconductor laser and not originating from the light spot, and to generate a second signal representing the detected light, in that the feedback device comprises a memory for storing, in the first adjusting phase, the second signal generated in relation to the controlled semiconductor laser, and in that the control device is adapted to control, in the second adjusting phase, a controlled semiconductor laser on the basis of the second signal generated in relation to the controlled semiconductor laser, such that the second signal generated in the second adjusting phase in relation to the controlled semiconductor laser substantially corresponds to the second signal stored in the memory in the first adjusting phase relating to the controlled semiconductor laser.

A method according to the invention is characterized in that, in a first adjusting phase, all semiconductor lasers are controlled one by one, in that, in the first adjusting phase, the intensity of a light spot originating from the controlled semiconductor laser and projected by the projection device is detected whenever a semiconductor laser is controlled, in that the detected intensity is used for adjusting the intensity at a predetermined value, in that, in the first adjusting phase, light emitted by the controlled semiconductor laser and not originating from the light spot is detected, and in that, in the first adjusting phase, a first signal is determined which is representative of the detected light not originating from the light spot, in that, in a second adjusting phase, all semiconductor lasers are controlled one by one, in that, in the second adjusting phase, light emitted by a controlled semiconductor laser and not originating from the light spot is detected, and in that a second signal is generated which is representative of the light detected in the second adjusting phase and not originating from the light spot, and in that, in the second adjusting phase, the controlled semiconductor laser is adjusted in such a way that the second signal is in a substantially fixed relation to the first signal determined in the first adjusting phase relating to the controlled semiconductor laser.

It is thereby achieved that, in the first adjusting phase, a memory device is filled with data about the quantity of light originating from every controlled semiconductor laser and reaches a second detector. The second detector is not situated in the light path between the relevant controlled semiconductor laser and the light spot. Nevertheless, the relation between the adjusted values of the intensity of the light spot and the value of the signal which is stored in the memory and generated by the second detector is a fixed relation. As a result, the signal generated by the second detector can be used for stabilization. It is thereby achieved that the detection of the light spot, after storage of the signal of the second detector in the memory, is no longer necessary for the stabilization, but that it is possible to work with the stored value of the signal of the second detector.

A preferred embodiment of the method is characterized in that the first adjusting phase takes place when the projection device as such is not being used, and in that the second adjusting phase takes place when the projection device as such is being used.

It is thereby achieved that the luminance of the image, as an expression of the intensity of the light spot, is adjusted once in the first adjusting phase when setting up the projection device, and is rendered equal for all semiconductor lasers, whereafter, during projection, the device makes use and can continue to make use of the values, stored in the memory, of the signal of the second detector for each semiconductor laser.

These and other aspects of the invention are apparent from and will be elucidated with reference to the embodiments described hereinafter.

Figure 1:
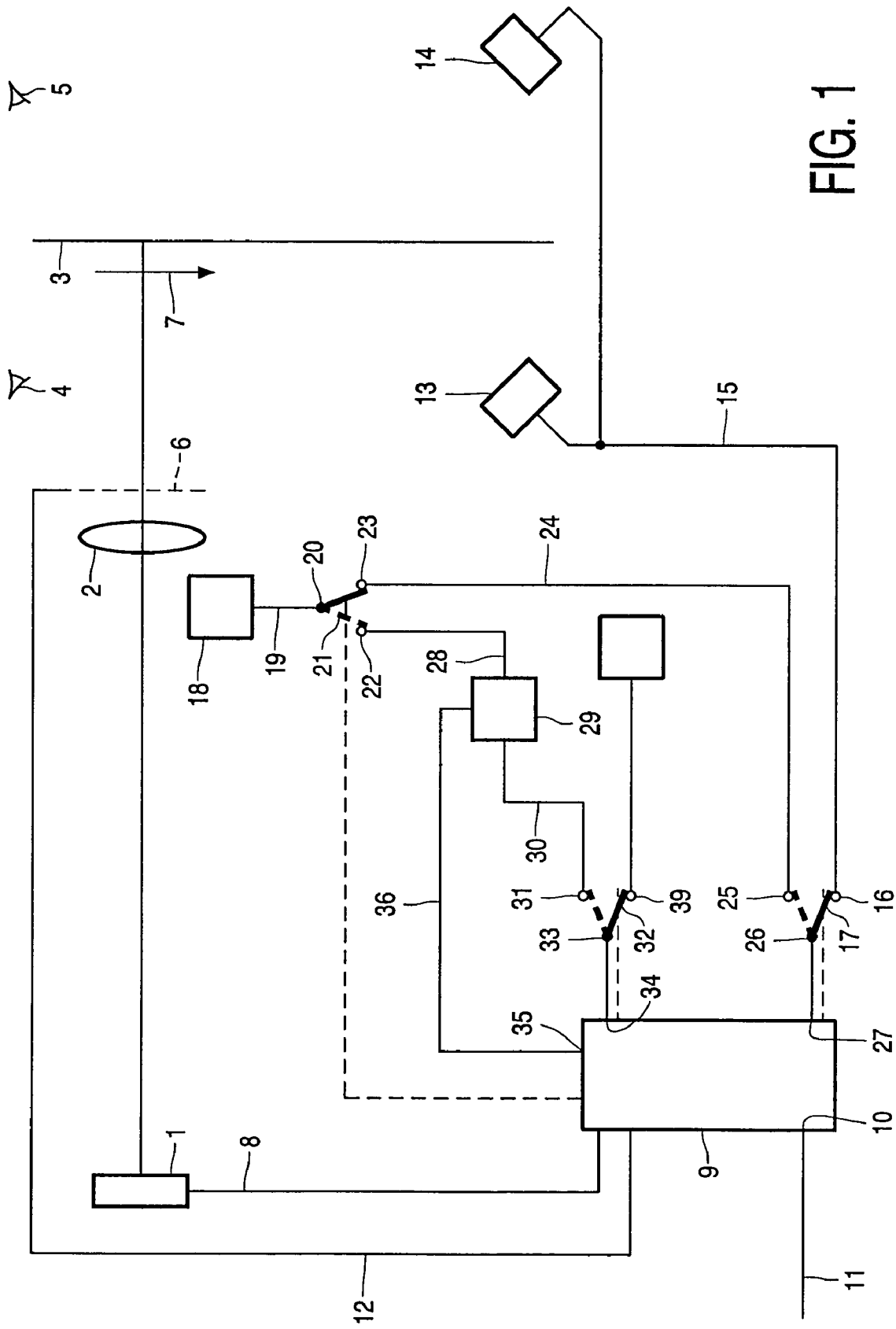
FIG. 1 shows diagrammatically a projection device according to the invention.

In FIG. 1, the reference numeral 1 denotes a one-dimensional matrix of semiconductor lasers. The semiconductor lasers are juxtaposed in a direction perpendicular to the plane of the drawing. Such a matrix is known per se. The matrix 1 of semiconductor lasers is projected on an element 3 by means of an optical system 2 which is shown diagrammatically. The element 3 may be opaque or translucent. If the element 3 is opaque, the projected image is to be viewed from the same direction as that from which the image is projected. This is indicated by means of the eye 4. If the element 3 is translucent, the projected image can be viewed from the other side, as is indicated diagrammatically by means of the eye 5. To project a two-dimensional image, a device 6 shown diagrammatically is provided, which ensures that the image of the matrix 1 of semiconductor lasers on the element 3 moves in the direction of the arrow 7, or in the opposite direction. The device 6 may be formed in known manner by a reciprocating or rotating mirror arrangement.

To obtain an acceptable image as a projected image on the element 3, the semiconductor lasers of the matrix 1 should have the same intensity of the light spot projected by the semiconductor lasers on the element 3 via the optical system 2, at the same input signal.

It is known that semiconductor lasers have a light output which is strongly dependent on the temperature of the semiconductor laser and on the elapsed lifetime of the semiconductor laser.

A semiconductor laser associated with the matrix 1 has very small dimensions. For example, the pitch is often only several tens of μm, for example, 50 μm. Consequently, the matrix of semiconductor lasers has a small thermal capacity and temperature fluctuations due to light output changes are relatively large and relatively fast. For obtaining a stable light output throughout the matrix 1, it is recommendable to limit the period of time between two consecutive adjustments of each semiconductor laser to one or several seconds, but preferably less, such that a predetermined light output corresponds to a predetermined value of the image signal, or conversely.

Known solutions of stabilizing the light output of a semiconductor laser make use of a photosensitive diode which is arranged on the rear side of the semiconductor laser and receives a quantity of light from the semiconductor laser which is directly proportional to the quantity of light emitted by the semiconductor laser on the front side. The relation between the quantity of light received by the photosensitive diode arranged on the rear side and the quantity of light emitted by the semiconductor laser on the front side is constant and independent of temperature and lifetime. However, in a projection device as shown in FIG. 1, the matrix 1 of semiconductor lasers has such small dimensions that it is impossible or very difficult to arrange an extra photosensitive diode for each semiconductor laser.

The device of FIG. 1 has been designed for repeated readjustment of the semiconductor lasers of the matrix 1 of semiconductor lasers. The matrix 1 of semiconductor lasers is controlled by a control device 9 via a line 8. The control device 9 has an input 10 to which a line 11 is connected through which an image signal of an image to be displayed by the projection device is supplied to the control device 9. Via a line 12, control device 9 is connected to the device 6. A first detector having one or more light-sensitive sensors 13 and 14 is arranged proximate to the element 3. If the projection device projects an image on an opaque element 3, the one or more light-sensitive sensors are in a position in which a projection of the matrix 1 of semiconductor lasers can be detected, such as at the location of sensor 13. If the element 3 is translucent, the one or more light-sensitive sensors 13 and 14 may be arranged on one or on both sides of the element 3. The outputs of the light-sensitive sensors 13 and 14 are connected via a line 15 to a connection 16 of a switch 17. A second light-sensitive detector 18 is arranged in such a way that light which directly or indirectly originates from the matrix of semiconductor lasers can reach the second detector 18, but light originating from the element 3 cannot. The second detector 18 may also comprise one or more light-sensitive sensors. An output of the second detector 18 is connected via a line 19 to a connection 20 of a switch 21. Connection 20 of switch 21 can be connected to a connection 22 or to a connection 23 of switch 21. Switch 23 is connected via a line 24 to a connection 25 of switch 17. A connection 26 of switch 17 is connected to an input 27 of control device 9. Connection 22 of switch 21 is connected via a line 28 to an input of a memory 29. An output of memory 29 is connected via a line 30 to a connection 31 of a switch 32. A connection 33 of switch 32 is connected to an input 34 of the control device 9. An output 35 of control device 9 is connected via a line 36 to an address input of memory 29.

A reference signal generator 37, which is preferably but not necessarily adjustable, is connected to connection 39 of switch 32 via a line 38.

As already noted hereinbefore, the matrix 1 of semiconductor lasers should be readjusted from time to time so as to ensure that, at equal values of the image signal for one or more semiconductor lasers, the light spots projected by the relevant semiconductor lasers on the element 3 have the same intensity. It is important that the relevant adjustment should take place whenever there is no image signal.

To this end, the device shown in FIG. 1 operates as follows. Before putting the projection device into use for projecting images, the control device is adjusted in a first adjusting phase. In the first adjusting phase, the switches 17, 21 and 32 are in the position as shown by way of the solid line in FIG. 1.

When the switches are in the position shown by way of the solid line, the first detector with the light-sensitive sensors 13 and 14 is connected to input 27 of control device 9 via line 15, connection 16, switch 17 and connection 26. Reference signal generator 37 such as, for example, an adjustable voltage generator, is connected to input 34 of control device 9 via line 38, connection 39, switch 32 and connection 33. Second detector 18 is connected to an input of memory 29 via line 19, connection 20, switch 21, connection 22 and line 28. The output of memory 29 is not connected to control device 9.

The circuit arrangement operates as follows. The control device 9 controls one semiconductor laser of the matrix 1 of semiconductor lasers with a predetermined, but further arbitrary, control signal via line 8. The device 6 is in a position or state in which the light from the controlled semiconductor laser gives rise to a light spot on element 3 via optical system 2. The intensity of the light spot thus projected on the element 3 is detected by means of the sensors 13 and 14 of the first detector and passed on to input 27 of control device 9. A reference signal is present at input 34 of control device 9. Control device 9 is adapted to compare the signal at input 27 with the reference signal at input 34. Based on the difference between the signals at the inputs 27 and 34, the control signal on line 8 is adapted by control device 9 in such a way that the intensity of the light spot on the element 3 gives rise to such a signal, supplied by the sensors 13 and 14, that the signal at the input 27 is equal to, or is in another predetermined fixed relation to the reference signal at input 34. After the signals at the inputs 27 and 34 have become equal, control device 9 generates a signal at output 35 and line 36, which addresses an address in memory 29 and causes memory 29 to store the signal value on line 28 at the memory location with the address on line 36. The address on line 36 is single-unambiguously bound to the semiconductor laser of the matrix 1 controlled at that instant by the control device 9.

The output signal from the second detector 18 is present on line 28. The output signal from the second detector is a measure of the light detected by the second detector 18, which light is emitted by the controlled semiconductor laser and does not originate from the light spot on the element 3. The intensity of the light spot on the element 3 is fixed by means of the feedback of the intensity of the projected light spot via the first detector formed by the sensors 13 and 14 to the control device 9, and the comparison with the reference signal. Moreover, a quantity of light being in a direct single-unambiguous relation to the relevant intensity and detected by the second detector 18 is fixed at a specific memory location of the memory 29. The relevant memory location is in a single-unambiguous relation to the semiconductor laser of the matrix 1 which is controlled at that instant by the control device 9 and supplied both the light spot projected on the element 3 and the second detector 18 with light. Consequently, a signal is stored at the relevant memory location in memory 29, which signal is in a single-unambiguous relation to a desired intensity of the light spot projected by the relevant controlled semiconductor laser on the element 3 via the optical system 2.

It is therefore possible to use a feedback device comprising the second detector 18, which supplies a measuring signal, and the memory 29, which supplies a reference signal. By means of a feedback loop, constituted by this feedback device and the semiconductor laser controlled by the control device 9, the quantity of light emitted by the relevant controlled semiconductor laser is stabilized at such a level that the second detector 18 detects the same quantity of light, or a quantity of light which is in a fixed relation thereto, as during adjustment in the first adjusting phase. This phase, in which the feedback loop is constituted by the second detector 18, the memory 29, the control device 9 and the relevant controlled semiconductor laser, will hereinafter be referred to as the second adjusting phase.

It has been described hereinbefore for the first adjusting phase how a specific, addressable memory location of the memory 29 is provided for one of the semiconductor lasers of the matrix 1 of semiconductor lasers, which signal is used as a reference signal in the second phase. The first adjusting phase thus described is consecutively carried out for all semiconductor lasers of the matrix 1 by controlling each semiconductor laser one by one via the control device 9 and adjusting them at the same intensity of the light spot projected by the relevant controlled semiconductor laser on the element 3 by means of the first detector with sensors 13, 14 and reference signal device 37. As soon as the relevant light spot has reached the relevant intensity, a signal, which is generated by the second detector 18 and is representative of the quantity of the light detected by the second detector 18, is stored in memory 29, addressed via line 36.

It is achieved in this way that a value of an output signal of the second detector 18 is stored in memory 29 at a plurality of addressable memory locations, corresponding to the number of semiconductor lasers in the matrix 1, and with each memory location being in a single-unambiguous relation to one of the semiconductor lasers, which value can be used as a reference value in a feedback loop. As stated hereinbefore, the phase in which the feedback loop makes use of the values stored in memory 29 will be referred to as second adjusting phase.

In the second adjusting phase, the switches 17, 21 and 32 are in the positions shown by way of the broken line. In the second adjusting phase, the semiconductor lasers of the matrix 1 are controlled one by one by the control device 9 whenever the semiconductor lasers of the matrix 1 must be stabilized, and the quantity of light emitted by the relevant controlled semiconductor laser is controlled by the control device 9 by means of a feedback loop comprising, inter alia, the second detector 18 and the memory location in the memory 29 corresponding to the relevant controlled semiconductor laser.

To prevent light from the relevant controlled semiconductor laser from reaching the element 3 outside the image to be projected during adjustment of the semiconductor lasers of the matrix 1 in the second adjusting phase, different measures can be taken. If the device 6 is a reciprocating or rotating mirror, there will be no image signal during the "flyback time" of the device 6. In that case, the control device 9 will cause the adjustment in the second adjusting phase to take place at instants when no image signal is applied to the semiconductor lasers of the matrix 1 of semiconductor lasers. The light ray emitted by a semiconductor laser to be adjusted will either not reach the screen 3 or reach it outside the image to be projected via the device 6. If the latter effect is considered to be troublesome, the screen 3 should be black in situ or in any case very dark, or a shutter should be placed in the light path to prevent the light from reaching the screen 3.

It is thereby achieved that the semiconductor lasers can function with the aid of the feedback loop constituted by, inter alia, the second detector 18 and the memory 29 and can ensure that the relevant controlled semiconductor laser is stabilized, while nevertheless the light emitted by the relevant controlled semiconductor laser does not reach the element 3. In the case of this possibility, a detector can detect the position of the device 6 and inform it via the line 12 to the control device 9. The device 6 may also be controlled via the line 12 by the control device 9, and the instants when light emitted by the semiconductor lasers of the matrix 1 cannot come within the image to be projected via the device 6 can be derived from the control signals for the device 6 which are passed on to the device 6 by the control device 9 via the line 12.

The device 6 may be alternatively a light shutter which can be electrically controlled from the control device 9 via the line 12. Electrically controllable light shutters are known per se and are not part of the present invention so that they will not be further described.

Figure 2:
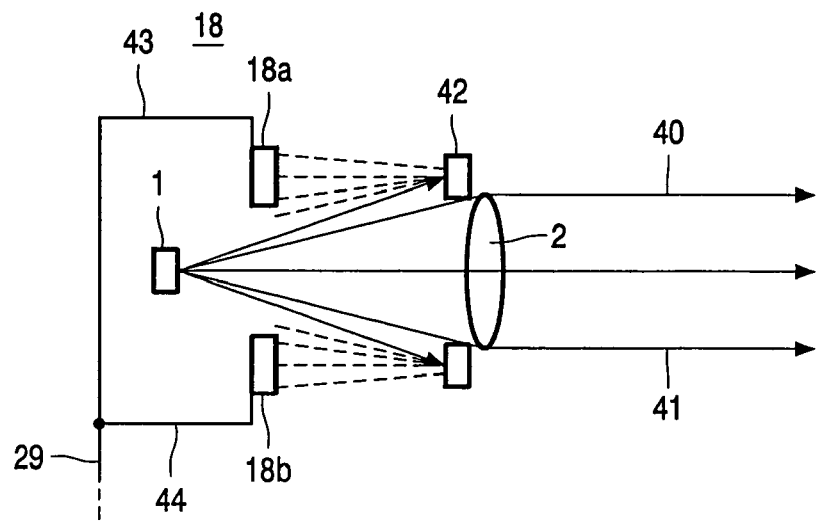
FIG. 2 shows a first embodiment of the second detector.

FIG. 2 shows an arrangement ensuring that light coming from a semiconductor laser of the matrix 1 can be detected by the second detector 18. In FIG. 2, the matrix 1 again extends perpendicularly to the plane of the drawing. In FIG. 2, the reference numerals 40 and 41 denote the boundary rays of a beam which originates from a semiconductor laser and is passed through the optical system 2. A diaphragm, diagrammatically denoted by reference numeral 42, is arranged between the matrix 1 and the optical system 2. The side of the diaphragm 42 directed towards the matrix 1 is more or less diffusely reflecting for reflecting incident light coming from a semiconductor laser of the matrix 1 in the direction of two light detectors 18a and 18b also extending perpendicularly to the plane of the drawing. The output signals of light detectors 18a and 18b are combined to the signal on line 29 via lines 43 and 44.

Figure 3:
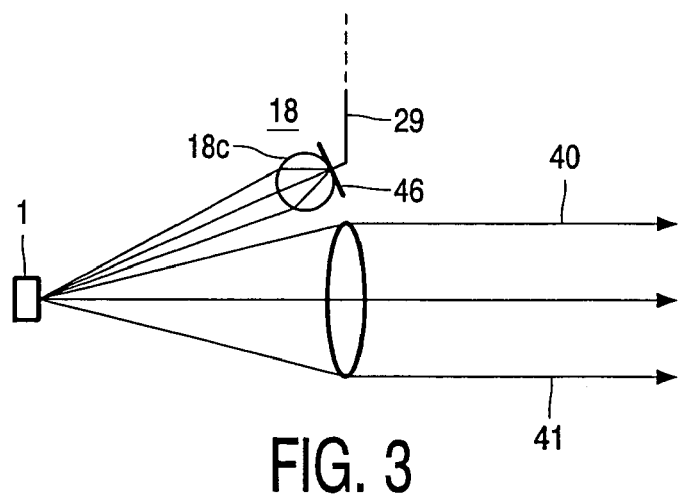
FIG. 3 shows a second embodiment of the second detector.
Figure 4:
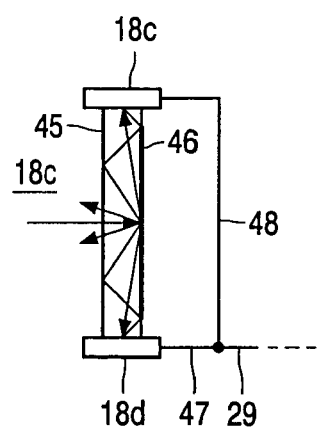
FIG. 4 is a side elevation of the second detector of FIG. 3.

FIGS. 3 and 4 show a different embodiment of the second detector 18, denoted by reference numeral 18c. Device 18c comprises an elongated, transparent and substantially cylindrical element 45. Element 45 is preferably polished on its outer side so as to obtain a maximal conductance of light. A part of the circumference of the element 45 is provided with a light-reflecting material 46. The element 45 may be bent round or, as is shown in FIG. 3, have a flat side. Two detectors 18d and 18e are arranged at the ends of the cylindrical element 45. The output signals of the detectors 18d and 18e are applied to the line 29 via lines 47 and 48.

In the foregoing, the switches 17, 21 and 32, the reference signal generator 37, the memory 29 as well as the lines present between these elements and the control device 9 are described as separate elements. It will be evident to those skilled in the art that said elements may be alternatively integrated in the control device 9, and that also the control device 9 and the integrated elements jointly form part of an integrated circuit. It will also be evident to those skilled in the art that the relevant elements are functionally present in a control device, but the relevant functions as described above for the first and the second adjusting phase and the coherent feedback loops can be alternatively implemented in and by a programmable device which is provided with a program consecutively performing the described functions.

It should also be noted that the reference signal device 37 may be adjustable for adjusting one or more reference values. It is thereby achieved that a modification of the intensity of the light spot projected by the semiconductor lasers on the element 3 can also be achieved by modifying the reference signal supplied by the reference signal device 37. As a result, the values stored in the memory 29 will also change and, finally, the intensity of the projected image during use of the device for projection purposes will be dependent on the chosen adjusted value of the reference signal supplied by the reference signal device 37.

Many modifications and alternative embodiments of the present invention can be conceived by those skilled in the art. All of these modifications and embodiments are considered to fall within the scope of the invention.

The invention claimed is:

1. A projection device comprising a matrix of semiconductor lasers, an optical system for imaging the matrix on an element illuminated by the projection device, a control device for controlling the semiconductor lasers, which control device comprises a feedback device including a first detector for detecting the intensity of a light spot projected by each semiconductor laser on the illuminated element via the optical system, and for generating a first signal representing the detected intensity, wherein the control device is adapted to control the semiconductor lasers one by one in a first adjusting phase and in a second adjusting phase, in that the control device is adapted to adjust the intensity of the light spot on the basis of the first signal in the first adjusting phase relating to a controlled semiconductor laser, in that the feedback device is adapted to detect, in the first adjusting phase, light emitted by the controlled semiconductor laser and not originating from the light spot, and to generate a second signal representing the detected light, in that the feedback device comprises a memory for storing, in the first adjusting phase, the second signal generated in relation to the controlled semiconductor laser, and in that the control device is adapted to control, in the second adjusting phase, a controlled semiconductor laser on the basis of the second signal generated in relation to the controlled semiconductor laser, such that the second signal generated in the second adjusting phase in relation to the controlled semiconductor laser substantially corresponds to the second signal stored in the memory in the first adjusting phase relating to the controlled semiconductor laser, wherein the first adjusting phase is during an imaging interval of time and the second adjusting phase is during a non-imaging interval of time.

2. A projection device as claimed in claim 1, wherein the feedback device comprises a second detector for detecting light emitted by the controlled semiconductor laser and not originating from the light spot, and for generating a second signal representing the detected light.

3. A projection device as claimed in claim 2, wherein the second detector is arranged for detecting reflected light.

4. A method of adjusting a projection device comprising a matrix of semiconductor lasers, the method comprising the acts of:
   adjusting an intensity of the matrix of semiconductor lasers one by one in a first adjusting phase in dependence on a predetermined value, wherein the first adjusting phase takes place at instants when an image signal is applied to the matrix of semiconductor lasers;
   detecting during the first adjusting phase, light emitted by the controlled matrix of semiconductor lasers that is not originating from a light spot;
   determining in the first adjusting phase, a first signal that is representative of the detected light not originating from the light spot;
   adjusting in a second adjusting phase, the matrix of semiconductor lasers one by one, wherein the second adjusting phase takes place at instants when no image signal is applied to the matrix of semiconductor lasers;
   detecting in the second adjusting phase, light emitted by the controlled matrix of semiconductor lasers not originating from the light spot; and
   generating a second signal that is representative of the light detected in the second adjusting phase, wherein in the second adjusting phase, the controlled matrix of semiconductor lasers is adjusted in such a way that the second signal is in a substantially fixed relation to the first signal.

5. A method as claimed in claim 4, wherein the light detected from the controlled matrix of semiconductor lasers that is not light originating from the light spot in both the first adjusting phase and the second adjusting phase is reflected light.

* * * * *